United States Patent
Katsuta et al.

(10) Patent No.: US 7,718,729 B2
(45) Date of Patent: May 18, 2010

(54) AQUEOUS INTERMEDIATE COATING COMPOSITION AND METHOD FOR FORMING MULTILAYER COATING FILM

(75) Inventors: Hideaki Katsuta, Hiratsuka (JP); Shingo Sato, Hiratsuka (JP); Satoru Furusawa, Hiratsuka (JP); Takato Adachi, Hiratsuka (JP)

(73) Assignee: Kansai Paint Co., Ltd., Amagasaki-Shi (JP)

( * ) Notice: Subject to any disclaimer, the term of this patent is extended or adjusted under 35 U.S.C. 154(b) by 904 days.

(21) Appl. No.: 11/354,111

(22) Filed: Feb. 15, 2006

(65) Prior Publication Data

US 2006/0188656 A1 Aug. 24, 2006

(30) Foreign Application Priority Data

Feb. 22, 2005 (JP) ............................. 2005-045376

(51) Int. Cl.
*B05D 7/00* (2006.01)
*B05D 1/36* (2006.01)
*C25D 5/00* (2006.01)

(52) U.S. Cl. ...................................... 524/560; 524/539

(58) Field of Classification Search ............... 427/407.1
See application file for complete search history.

(56) References Cited

U.S. PATENT DOCUMENTS

| 2002/0009550 A1 | 1/2002 | Yoshioka et al. |
| 2004/0228975 A1* | 11/2004 | Takesako et al. .......... 427/372.2 |

FOREIGN PATENT DOCUMENTS

| JP | 2004-043524 | 2/2004 |
| JP | 2004-298836 | 10/2004 |

* cited by examiner

*Primary Examiner*—Michael Barr
*Assistant Examiner*—Ryan Schiro
(74) *Attorney, Agent, or Firm*—Kratz, Quintos & Hanson, LLP

(57) ABSTRACT

The present invention provides an aqueous intermediate coating composition comprising (A) an acrylic emulsion resin having a hydroxy value of 5 to 80 mgKOH/g and an acid value of 1 to 15 mgKOH/g, obtainable by emulsion polymerization of monomer mixture (a) comprising ethyl acrylate, a hydroxy-containing radically polymerizable unsaturated monomer and a carboxy-containing radically polymerizable unsaturated monomer, the ethyl acrylate content of the monomer mixture being 60 wt. % or more; (B) a carboxy-containing resin having a hydroxy value of more than 80 mgKOH/g but not more than 200 mgKOH/g; (C) a curing agent; and (D) a coloring pigment, and having a solids content of 60 wt. % or more. The invention also provides a method for forming a multilayer coating film using said aqueous intermediate coating composition.

8 Claims, No Drawings

AQUEOUS INTERMEDIATE COATING COMPOSITION AND METHOD FOR FORMING MULTILAYER COATING FILM

BACKGROUND OF THE INVENTION

1. Field of the Invention

The present invention relates to an aqueous intermediate coating composition and a method for forming a multilayer-coating film using the same.

2. Description of Related Art

Automotive bodies, especially exterior panel parts thereof, are usually coated with a multilayer coating film formed from an electrodeposition undercoat, an intermediate coat and a topcoat, to impart higher corrosion resistance and to improve appearance.

When a car is running, chipping occurs such that small stones, pebbles, antifreezing agents, small lumps of ice or like objects on the road are kicked up by the tires of the car and hit the exterior panel parts, thereby scratching the multilayer coating film, or even, in some extreme cases, locally damaging and chipping off the film. These phenomena cause problems such as harm to the external appearance, and exposure of the metal substrate which results in rusting and/or corrosion. In order to avoid these problems, an anti-chipping primer is often applied between the undercoat and the intermediate coat, which however is disadvantageous as it increases the number of coating steps. Accordingly, there is a demand for an intermediate coating composition that can form a multi-layer coating film with higher chipping resistance without using an anti-chipping primer, thereby saving the number of coating steps.

Further, although organic solvent-based coating compositions are predominant among conventional intermediate coating compositions, an intermediate coating composition with an aqueous nature and a higher solids content is demanded to mitigate adverse effects on health and the environment, to reduce volatile organic compounds (VOC), and to improve coating efficiency.

JP 2004-43524 A discloses an aqueous intermediate coating composition comprising a graft polymer as a resin component, wherein the backbone polymer is a polyester resin and the branched polymer is an acrylic resin.

The viscosity of this intermediate coating composition is low even at a high solids content and thus is advantageous in that it can be applied in a high-solids-content state. However, this coating composition exhibits defects such that because its chipping resistance, a required property for an intermediate coating composition, is insufficient, when it is used without an anti-chipping primer, chipping resistance of the resulting coat is significantly lowered.

JP 2004-298836 A discloses a method for forming a coating film comprising the steps of applying, to a substrate whereon an electrodeposition coating layer has been formed, an aqueous intermediate coating composition comprising, together with a curing agent etc., an acryl resin emulsion having a glass transition temperature of −50 to 20° C., an acid value of 2 to 60 mgKOH/g and a hydroxy value of 10 to 120 mgKOH/g, obtained by emulsion polymerization of an alkyl (meth)acrylate, an acid group-containing ethylenic unsaturated monomer and a hydroxy-containing ethylenic unsaturated monomer; then an aqueous base coating composition; and then a clear coating composition, and simultaneously heat-curing the obtained three-layer coating film.

However, water resistance and like properties of a multilayer coating film obtained by this method are insufficient. Further, when, in this method, the intermediate coating layer is heat-cured before subsequent coating applications, the adhesion between the intermediate coating layer and the base coating layer is lowered, whereby chipping resistance of the multilayer coating film is also reduced.

BRIEF SUMMARY OF THE INVENTION

An object of the present invention is to provide a high-solids-content aqueous intermediate coating composition, capable of forming a multilayer coating film having excellent chipping resistance and water resistance, together with an improved appearance, etc., without requiring an anti-chipping primer; and a method for forming a multilayer coating film using the same.

The present inventors conducted intensive research to achieve the above object. As a result, they found that an aqueous intermediate coating composition comprising, as a resin component, an acrylic emulsion resin having a hydroxy value of 80 mgKOH/g or less and like properties, obtainable by emulsion polymerization of a monomer mixture containing a specific quantity or more of ethyl acrylate, a hydroxy-containing radically polymerizable unsaturated monomer and a carboxy-containing radically polymerizable unsaturated monomer, and a hydroxy-containing resin having a hydroxy value of more than 80 mgKOH/g, and whose solids content is 60 wt. % or more, can provide a multilayer coating film with excellent chipping resistance, high water resistance, enhanced appearance, etc., without requiring an anti-chipping primer. The present invention has been accomplished based on these novel findings.

The present invention provides the following aqueous intermediate coating compositions and methods for forming multilayer coating films using the same.

1. An aqueous intermediate coating composition comprising:

(A) an acrylic emulsion resin having a hydroxy value of 5 to 80 mgKOH/g and an acid value of 1 to 15 mgKOH/g, obtainable by emulsion polymerization of monomer mixture (a) comprising ethyl acrylate, a hydroxy-containing radically polymerizable unsaturated monomer and a carboxy-containing radically polymerizable unsaturated monomer, the ethyl acrylate content of the monomer mixture being 60 wt. % or more;

(B) a hydroxy-containing resin having a hydroxy value of more than 80 mgKOH/g but not more than 200 mgKOH/g;

(C) a curing agent; and (D) a coloring pigment, the solids content of said aqueous intermediate coating composition being 60 wt. % or more.

2. An aqueous intermediate coating composition according to Item 1, wherein acrylic emulsion resin (A) is obtainable by emulsion polymerization of monomer mixture (a) using a hydroxy-containing resin as an emulsifier.

3. An aqueous intermediate coating composition according to Item 1, wherein hydroxy-containing resin (B) contains at least one acid group and has an acid value of 1 to 70 mgKOH/g.

4. An aqueous intermediate coating composition according to Item 1, wherein the proportions of acrylic emulsion resin (A) and hydroxy-containing resin (B) are 30 to 99 wt. % and 1 to 70 wt. %, respectively, of the total weight of these resins.

5. An aqueous intermediate coating composition according to Item 1, wherein the proportion of curing agent (C) is 1 to 150 parts by weight per 100 parts by weight in total of acrylic emulsion resin (A) and hydroxy-containing resin (B).

6. An aqueous intermediate coating composition according to Item 1, wherein the proportion of coloring pigment (D) is 1 to 400 parts by weight per 100 parts by weight in total of acrylic emulsion resin (A) and hydroxy-containing resin (B).

7. An aqueous intermediate coating composition according to Item 1, whose viscosity as measured by Ford Cup No. 4 (20° C.) is 15 to 60 seconds.

8. A method for forming a multilayer coating film comprising the steps of forming on a substrate an electrodeposition coating layer, an intermediate coating layer, and then a topcoating layer, characterized in that the intermediate coating layer is formed from the aqueous intermediate coating composition of Item 1.

9. A method for forming a multilayer coating film according to Item 8, wherein the substrate is an automotive body.

DETAILED DESCRIPTION OF THE INVENTION

Aqueous Intermediate Coating Composition

The aqueous intermediate coating composition of the present invention comprises acrylic emulsion resin (A), hydroxy-containing resin (B), curing agent (C) and coloring pigment (D), and has a solids content of 60 wt. % or more.

Acrylic Emulsion Resin (A)

Acrylic emulsion resin (A) is obtainable by emulsion polymerization of monomer mixture (a) comprising ethyl acrylate, a hydroxy-containing radically polymerizable unsaturated monomer and a carboxy-containing radically polymerizable unsaturated monomer, the ethyl acrylate content of the monomer mixture being 60 wt. % or more. Such acrylic emulsion resin (A) has a hydroxy value of 5 to 80 mgKOH/g and an acid value of 1 to 15 mgKOH/g.

The emulsion polymerization can be performed by radically polymerizing monomer mixture (a) in the presence of an emulsifier, a polymerization initiator, and water.

When the proportion of ethyl acrylate in monomer mixture (a) is 60 wt. % or more, and preferably 70 wt. % or more, relative to the total weight of the monomer mixture, a high-solids-content aqueous coating composition having a solids content of 60 wt. % or more can be obtained. Further, when such a composition is employed as an intermediate coating composition for forming a multilayer coating film comprising an undercoating layer, an intermediate coating layer and a topcoating layer, a multilayer coating film excellent in chipping resistance and the like can be obtained. An ethyl acrylate content of less than 60 wt. % leads to a multilayer coating film having poor water resistance, and chipping resistance of such a film is also insufficient. It is especially preferable that the ethyl acrylate content of monomer mixture (a) be about 80 to about 95 wt. %.

Examples of usable hydroxy-containing radically polymerizable unsaturated monomers for monomer mixture (a) include monoesterification products of $C_{2-20}$ glycols and (meth)acrylic acid, such as 2-hydroxyethyl(meth)acrylate, hydroxypropyl(meth)acrylate and hydroxybutyl(meth)acrylate. The amount of hydroxy-containing radically polymerizable unsaturated monomer can be suitably selected such that the hydroxy value of the resultant acrylic emulsion resin is within the range of 5 to 80 mgKOH/g.

Examples of usable carboxy-containing radically polymerizable unsaturated monomers include acrylic acid, methacrylic acid, crotonic acid, itaconic acid, maleic acid, fumaric acid and the like. The amount of carboxy-containing radically polymerizable unsaturated monomer can be suitably determined so that the acid value of the resultant acrylic emulsion resin is within the range of 1 to 15 mgKOH/g.

Monomer mixture (a) may further contain, as other monomers, monoesterification products of (meth)acrylic acid and $C_{1-22}$ monohydric alcohols other than ethyl acrylate, such as methyl (meth)acrylate, ethyl methacrylate, propyl(meth) acrylate, butyl (meth)acrylate, hexyl(meth)acrylate, octyl (meth)acrylate, lauryl(meth)acrylate, 2-ethylhexyl(meth) acrylate, cyclohexyl (meth)acrylate and isobornyl(meth) acrylate; $C_{2-18}$ alkoxyalkyl (meth)acrylates such as methoxybutyl(meth)acrylate and methoxyethyl(meth)acrylate; alkylamino acrylate monomers such as N,N-dimethylaminoethyl(meth)acrylate, N,N-diethylaminoethyl (meth) acrylate, N-t-butylaminoethyl(meth)acrylate and N,N-dimethylaminopropyl (meth)acrylate; acrylamide monomers such as acrylamide, methacrylamide, N-methylacrylamide, N-methylmethacrylamide, N-ethylacrylamide, N-ethylmethacrylamide, N-butylacrylamide, N-butylmethacrylamide, N-dimethylacrylamide and N-dimethylmethacrylamide; styrene, α-methylstyrene, vinyltoluene, acrylonitrile, vinyl acetate, "VEOVA 9" (a tradename of Japan Epoxy Resins Co., Ltd., a $C_9$ Versatic acid vinyl ester), "VEOVA 10" (a tradename of Japan Epoxy Resins Co., Ltd., a $C_{10}$ Versatic acid vinyl ester), vinyl chloride, etc. It is also possible to crosslink the emulsion resin particles by using a polyvinyl compound containing at least two polymerizable unsaturated bonds per molecule.

Examples of such polyvinyl compounds include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth) acrylate, pentaerythritol di(meth)acrylate, pentaerythritol tetra(meth)acrylate, glycerol di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl) propane tri(meth)acrylate, triallyl isocyanurate, diallyl terephthalate, divinylbenzene and the like.

Ordinary emulsifiers conventionally employed for emulsion polymerization reactions can be used as the above-mentioned emulsifier for emulsion polymerization of monomer mixture (a).

Such emulsifiers include, for example, nonionic emulsifiers, anionic emulsifiers and the like.

Examples of usable nonionic emulsifiers include polyoxyethylene lauryl ether, polyoxyethylene octylphenyl ether, polyoxyethylene oleylphenyl ether, polyoxyethylene nonylphenyl ether, oxyethylene-oxypropylene block copolymer, tert-octylphenoxy ethyl polyethoxyethanol, nonylphenoxy ethyl polyethoxyethanol, etc.

Examples of usable anionic emulsifiers include sodium salts such as sodium dodecylbenzenesulfonate, sodium laurylsulfate, sodium alkyldiphenyl ether disulfonates, sodium alkylnaphthalene sulfonates, sodium dialkylsulfosuccinates, sodium stearate, sodium dioctylsulfosuccinate, sodium polyoxyethylene alkyl ether sulfates, sodium polyoxyethylene alkylphenyl ether sulfates, sodium oleate and sodium tert-octylphenoxyethoxypolyethoxyethylsulfate; potassium salts such as potassium oleate; and ammonium salts such as ammonium polyoxyethylene alkyl ether sulfates and ammonium polyoxyethylene alkylphenyl ether sulfates.

These emulsifiers can be used singly or in combination of two or more.

The amount of emulsifier is not limited, and preferably is about 3 wt. % or less relative to the weight of monomer mixture (a) in order to prevent lowering of the film performance, such as water resistance.

Examples of usable polymerization initiators for emulsion polymerization include any one of those commonly used for emulsion polymerization, e.g., hydrogen peroxide; persulfates such as ammonium persulfate, potassium persulfate and sodium persulfate; organic peroxides such as cumene hydroperoxide, t-butyl hydroperoxide, benzoyl peroxide, t-butyl peroxy-2-ethylhexanoate, t-butyl peroxybenzoate and lauroyl peroxide; azo compounds such as 4,4'-azobis(4-cyanobutanoic acid) and 2,2'-azobis{2-methyl-N-[-(1-hydroxybutyl)]-propylamide}; redox initiators such as combinations of the above peroxides and reducing agents including sodium sulfoxylate, formaldehyde, sodium pyrosulfite, sodium hydrogensulfite, L-ascorbic acid and rongalite; etc. These polymerization initiators can be used singly or in combination of two or more.

The amount of polymerization initiator is usually about 0.01 to about 5 wt. %, and preferably about 0.03 to about 3 wt. %, relative to the weight of monomer mixture (a).

The temperature and time of the emulsion polymerization reaction vary with the type of polymerization initiator, and ranges of about 30 to about 150° C. and about 30 minutes to about 10 hours, respectively, are usually suitable.

Such an emulsion polymerization reaction is usually conducted in one step, and acrylic emulsion resin (A) is thereby obtained.

Where necessary, the emulsion polymerization can be carried out by a multistage process so that resultant acrylic emulsion resin (A) will have a core/shell type or core/shell/shell type structure.

Acrylic emulsion resin (A) may also be obtained by emulsion polymerization of monomer mixture (a) using a hydroxy-containing resin as an emulsifier. A resin thereby obtained is a hybrid resin of an emulsified polymer of monomer mixture (a) and the emulsifier hydroxy-containing resin, and this resin can be used as acrylic emulsion resin (A) insofar as it has an hydroxy value of 5 to 80 mgKOH/g and an acid value of 1 to 15 mgKOH/g.

Hydroxy-containing resins usable as an emulsifier include those containing, as well as hydroxy groups, acid groups in order to make such resins water-soluble or water-dispersible by neutralization with a basic compound. Carboxy group, sulfonic acid group and phosphoric acid group can be mentioned as examples of acid groups. Kinds of usable resins include polyester resins, acrylic resins, urethane resins and the like. It is suitable that such a hydroxy-containing resin has an acid value of about 10 to about 70 mgKOH/g, and preferably about 20 to about 50 mgKOH/g; a hydroxy value of about 20 to about 200 mgKOH/g, and preferably about 50 to about 170 mgKOH/g; and a number average molecular weight as determined by GPC (gel permeation chromatography) of about 1,000 to about 50,000, and preferably about 2,000 to about 20,000.

The above hydroxy-containing resins can be produced, for example, in the same manner as the below-mentioned method for manufacturing hydroxy-containing resin (B).

When producing acrylic emulsion resin (A) using a hydroxy-containing resin as an emulsifier, the proportions of monomer mixture (a) and the hydroxy-containing resin in the total solids weight thereof are preferably such that the former is about 50 to about 80 wt. % and the latter is about 20 to about 50 wt. %. Polymerization initiators, reaction temperature and reaction time for such emulsion polymerization may be the same as when an ordinary emulsifier as above is employed. A small quantity of the ordinary emulsifier may be used as an emulsifier together with the hydroxy-containing resin.

The mean particle diameter of resin particles of acrylic emulsion resin (A) obtained by an emulsion polymerization reaction using the above ordinary emulsifier and/or hydroxy-containing resin as an emulsifier is usually about 0.1 to about 1.0 μm, and preferably about 0.12 to about 0.3 μm. A mean particle diameter of resin particles in this range is preferable in order to achieve high stability of a resin (A)-containing high-solids-content aqueous coating composition, to improve the appearance of the resulting coating film, etc.

In this specification, the mean particle diameters of resin particles are measured at ambient temperature (about 20° C.) using a laser diffraction particle size analyzer. Commercial products of laser diffraction particle size analyzers can be used, including, for example, "COULTER N4 Submicron Particle Analyzer" (a tradename of Nikkaki Co., Ltd.).

Acrylic emulsion resin (A) has a hydroxy value within the range of about 5 to about 80 mgKOH/g and an acid value within the range of about 1 to about 15 mgKOH/g. A hydroxy value of less than 5 mgKOH/g results in lowered stability of the resultant coating composition, while a high-solids-content aqueous coating composition cannot be obtained when the hydroxy value is more than 80 mgKOH/g. An acid value of under 1 mgKOH/g results in lowered stability of the resultant coating composition, while a high-solids-content aqueous coating composition cannot be obtained when the acid value is more than 15 mgKOH/g.

Acrylic emulsion resin (A) preferably has a glass transition temperature as measured by DSC (differential scanning calorimetry) of about −50 to about +20° C., and more preferably about −30 to about +10° C. When the glass transition temperature exceeds +20° C., chipping resistance of the multilayer coating film tends to be reduced.

Hydroxy-Containing Resin (B)

The aqueous intermediate coating composition of the present invention contains, for improved curability etc., hydroxy-containing resin (B) having a hydroxy value of more than 80 mgKOH/g but not more than 200 mgKOH/g.

Hydroxy-containing resin (B) usually contains, as well as hydroxy group(s), acid group(s) in order to impart water solubility or water dispersibility to such a resin by neutralization with a basic compound. Carboxy group, sulfonic acid group and phosphoric acid group can be mentioned as examples of acid groups. Kinds of usable resins include polyester resins, acrylics resins, urethane resins and the like.

It is preferable that hydroxy-containing resin (B) bears at least one acid group and has an acid value of 1 to 70 mgKOH/g, to obtain a high-solids-content aqueous coating composition.

Polyester resins usable as resin (B) can be prepared by an esterification reaction of a polybasic acid with a polyhydric alcohol. Polybasic acids have two or more carboxy groups per molecule, and examples thereof include aromatic dicarboxylic acids such as terephthalic acid, isophthalic acid, phthalic acid, naphthalene dicarboxylic acid, 4,4'-biphenyldicarboxylic acid, diphenylmethane-4,4'-dicarboxylic acid, and anhydrides thereof; alicyclic dicarboxylic acids such as hexahydroisophthalic acid, hexahydroterephthalic acid, hexahydrophthalic acid, tetrahydrophthalic acid, and anhydrides thereof; aliphatic dicarboxylic acids such as adipic acid, sebacic acid, suberic acid, succinic acid, glutaric acid, maleic acid, chloro maleic acid, fumaric acid, dodecanedioic acid, pimelic acid, azelaic acid, itaconic acid, citraconic acid, Dimer acid, and anhydrides thereof; lower alkyl esters of such dicarboxylic acids, such as methyl esters and ethyl esters; trihydric or higher polybasic acids such as trimellitic acid, anhydrous trimellitic acid, pyromellitic acid, anhydrous pyromellitic acid, trimesic acid, methylcyclohexene tricarboxylic acid, tetrachloro hexene tricarboxylic acid, and anhydrides of such acids; etc.

Polyhydric alcohols have two or more hydroxy groups per molecule, and examples thereof include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid and neopentyl glycol esters; polylactone diols obtained by adding lactones such as ε-caprolactone to such dihydric alcohols; ester diols such as bis(hydroxyethyl)terephthalate; polyether diols such as alkylene oxide adducts of bisphenol-A, polyethylene glycol, polypropylene glycol and polybutylene glycol; trihydric and higher alcohols such as glycerol, trimethylolpropane, trimethylolethane, diglycerol, triglycerol, 1,2,6-hexanetriol, pentaerythritol, dipentaerythritol, sorbitol and mannite; polylactonepolyols obtained by adding lactones such as ε-caprolactone to such trihydric or higher alcohols; and alicyclic polyhydric alcohols such as 1,4-cyclohexandimethanol, tricyclodecanedimethanol, hydrogenated bisphenol-A and hydrogenated bisphenol-F. It is also possible to obtain an alcoholic compound by reacting acids with α-olefin epoxides such as propylene oxide and buthylene oxide, or with monoepoxy compounds such as "Cardura E10" (a tradename of Japan Epoxy Resin Co., Ltd., a glycidyl ester of synthetic highly branched saturated fatty acids), and introduce the same into a polyester resin.

Acrylic resins usable as resin (B) are obtainable by adding about 0.5 to about 10 parts by weight of a polymerization initiator to 100 parts by weight of a radically polymerizable unsaturated monomer mixture and subjecting them to a radical polymerization reaction in the presence of an organic solvent. Monomer mixture (a) for acrylic emulsion resin (A) is preferably used as the radically polymerizable unsaturated monomer mixture. The temperature of the radical polymerization reaction depends on the kind of the polymerization initiator and is usually in the range of about 30 to about 150° C. The time of the reaction is suitably selected in accordance with the temperature and is usually in the range of about 30 minutes to about 10 hours. Compounds commonly known as a radical generator can be used as a polymerization initiator, and examples thereof include peroxides such as benzoyl peroxide, lauroyl peroxide, isobutyl peroxide, methyl ethyl ketone peroxide, t-butyl peroxy-2-ethylhexanoate, t-amyl peroxy-2-ethylhexanoate, di-t-butyl peroxide and di-t-amyl peroxide; azo initiators such as azobisisobutyronitrile; etc.

Urethane resins usable as resin (B) usually have carboxy groups in the molecule so as to be water dispersibile. A standard method for introducing a carboxy group into a urethane resin is reacting a mixture of a non-carboxy-containing polyol and a carboxy-containing polyol with a diisocyanate, to thereby introduce the carboxy group into the urethane skeleton.

Examples of usable non-carboxy-containing polyols include, among low molecular weight polyols, the above-described polyhydric alcohols used for the polyester synthesis. Examples among high molecular weight polyols include polyether polyols, polyester polyols, acrylic polyols, epoxy polyols, etc. Usable polyether polyols are polyethylene glycol, polypropylene glycol, polytetramethylene glycol, etc. In addition, polycaprolactone and like polyols obtained by ring-opening-polymerization of lactone, polycarbonate diols and the like are also usable.

Examples of usable carboxy-containing polyols include 2,2-dimethylolpropionic acid, 2,2-dimethylolbutanoic acid, etc., and 2,2-dimethylolpropionic acid is especially preferable. When using carboxy-containing polyols, a small quantity of solvent such as N-methylpyrrolidone can be conjointly used to accelerate the reaction. It is preferable that the amount of such a carboxy-containing polyol be 5 to 30 parts by weight per 100 parts by weight of a non-carboxy-containing polyol in terms of water dispersibility and water resistance of the resulting coating film.

Further, a radically polymerizable unsaturated group can be introduced into a urethane resin by reacting a hydroxy-containing radically polymerizable unsaturated monomer with at least one polyol (selected from the above non-carboxy-containing polyols and carboxy-containing polyols) and at least one polyisocyanate compound. Examples of usable hydroxy-containing radically polymerizable unsaturated monomers include 2-hydroxyethyl(meth)acrylate, 2-hydroxypropyl(meth)acrylate, 4-hydroxybutyl(meth)acrylate, etc.

Examples of usable polyisocyanate compounds include: aliphatic polyisocyanates such as hexamethylene diisocyanate, trimethylhexamethylene diisocyanate, Dimer acid diisocyanate and lysine diisocyanate; biuret adducts and isocyanuric ring adducts of such polyisocyanates; alicyclic diisocyanates such as isophorone diisocyanate, 4,4'-methylenebis(cyclohexyl isocyanate), methylcyclohexane-2,4-diisocyanate, methylcyclohexane-2,6-diisocyanate, 1,3-di(isocyanatomethyl)cyclohexane, 1,4-di(isocyanatomethyl)cyclohexane, 1,4-cyclohexane diisocyanate, 1,3-cyclopentane diisocyanate and 1,2-cyclohexane diisocyanate; biuret adducts and isocyanuric ring adducts of such polyisocyanates;

aromatic diisocyanate compounds such as xylylene diisocyanate, metaxylylene diisocyanate, tetramethyl xylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, m-phenylene diisocyanate, p-phenylene diisocyanate 4,4'-biphenylene diisocyanate, 3,3'-dimethyl-4,4'-biphenylene diisocyanate, bis(4-isocyanatophenyl)sulfone and isopropylidene bis(4-phenylisocyanate); biuret adducts and isocyanuric ring adducts of such polyisocyanates;

polyisocyanates having more than three isocyanate groups per molecule, such as triphenylmethane-4,4',4"-triisocyanate, 1,3,5-triisocyanatobenzene, 2,4,6-triisocyanatotoluene and 4,4'-dimethyldiphenylmethane-2,2',5,5'-tetraisocyanate; biuret adducts and isocyanuric ring adducts of such polyisocyanates; urethanized adducts obtained by reacting a polyol such as ethylene glycol, propylene glycol, 1,4-butylene glycol, dimethylolpropionic acid, polyalkylene glycols, trimethylol propane or hexanetriol, with a polyisocyanate compound in a ratio such that the amount of isocyanate groups is excessive relative to the amount of polyol hydroxy groups; biuret adducts and isocyanuric ring adducts of such polyisocyanates; etc.

Hydroxy-containing resin (B) can be made water-soluble or water-dispersible by neutralizing acid group(s) contained therein such as carboxy group, sulfonic acid group, phosphoric acid group and the like with a basic compound.

Examples of usable basic compounds include alkali metal and alkaline earth metal hydroxides such as sodium hydroxide, potassium hydroxide, lithium hydroxide, calcium hydroxide and barium hydroxide; ammonia; primary monoamines such as ethylamine, propylamine, butylamine, benzylamine, monoethanolamine, neopentanolamine, 2-aminopropanol and 3-aminopropanol; secondary monoamines such as diethylamine, diethanolamine, di-n-propanolamine, di-iso-propanolamine, N-methylethanolamine and N-ethylethanolamine; tertiary monoamines such as dimethylethanolamine, trimethylamine, triethylamine, triisopropylamine, methyldiethanolamine and dimethylaminoethanol; polyamines such as diethylenetriamine, hydroxyethylaminoethylamine, ethylaminoethylamine and methylaminopropylamine; etc. The amount of basic compound is usually within the range of 0.1 to 1.5 equivalents, and preferably 0.2 and 1.2 equivalents, of the acid groups of the hydroxy-containing resin.

When the acid value of hydroxy-containing resin (B) is 10 mgKOH/g or less, it is possible to mix hydroxy-containing resin (B) and an emulsifier, forcibly disperse them in the water by stirring with the application of a mechanical shearing force, instead of neutralization with a basic compound, and use the obtained dispersion product.

Curing Agent (C)

Melamine resins, blocked polyisocyanate compounds and the like can be used as curing agent (C).

Examples of usable melamine resins include methylolated melamine resins obtained by methylolation of melamine with formaldehyde; alkylated melamine resins obtained by etherification of such methylol groups with monoalcohols; imino-containing methylolated melamine resins and alkylated melamine; etc. The etherification of methylol groups may be mixed alkylation using two or more kinds of monoalcohols. Examples of usable monoalcohols include methyl alcohol, ethyl alcohol, n-propyl alcohol, i-propyl alcohol, n-butyl alcohol, i-butyl alcohol, 2-ethylbutanol, 2-ethylhexanol, etc.

Specifically, methylated melamine resins, imino-containing methylated melamine resins, methylated/butylated melamine resins, imino-containing methylated/butylated melamine resins and the like are preferable, and imino-containing methylated melamine resins are particularly preferable.

Examples of commercial melamine resins which correspond to above preferable melamine resins include those available on the market under the tradenames of "Cymel 202", "Cymel 232", "Cymel 235", "Cymel 238", "Cymel 254", "Cymel 266", "Cymel 267", "Cymel 272", "Cymel 285", "Cymel 301", "Cymel 303", "Cymel 325", "Cymel 327", "Cymel 350", "Cymel 370", "Cymel 701", "Cymel 703", "Cymel 736", "Cymel 738", "Cymel 771", "Cymel 1141", "Cymel 1156", "Cymel 1158", etc. (manufactured by Japan Cytec Industries, Inc.); "U-VAN 120", "U-VAN 20HS", "U-VAN 2021", "U-VAN 2028", "U-VAN 2061", etc. (manufactured by Mitsui Chemicals, Inc.); and "Melan 522" etc. (manufactured by Hitachi Chemical Co., Ltd.).

Blocked polyisocyanate compounds are obtained by blocking isocyanate groups of polyisocyanates which contain two or more free isocyanate groups per molecule with blocking agents.

Examples of usable polyisocyanate compounds include: aliphatic polyisocyanates such as hexamethylene diisocyanate, trimethylhexamethylene diisocyanate, Dimer acid diisocyanate and lysine diisocyanate; biuret adducts and isocyanuric ring adducts of such polyisocyanates;

alicyclic diisocyanates such as isophorone diisocyanate, 4,4'-methylenebis(cyclohexyl isocyanate), methylcyclohexane-2,4-diisocyanate, methylcyclohexane-2,6-diisocyanate, 1,3-di(isocyanatomethyl)cyclohexane, 1,4-di(isocyanatomethyl)cyclohexane, 1,4-cyclohexane diisocyanate, 1,3-cyclopentane diisocyanate and 1,2-cyclohexane diisocyanate; biuret adducts and isocyanuric ring adducts of such polyisocyanates; aromatic diisocyanate compounds such as xylylene diisocyanate, meta-xylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, m-phenylene diisocyanate, p-phenylene diisocyanate 4,4'-biphenylene diisocyanate, 3,3'-dimethyl-4,4'-biphenylene diisocyanate, bis(4-isocyanatophenyl)sulfone and isopropylidene bis(4-phenyl isocyanate); biuret adducts and isocyanuric ring adducts of such polyisocyanates;

polyisocyanates containing three or more isocyanate groups per molecule, such as triphenylmethane-4,4',4"-tri isocyanate, 1,3,5-triisocyanatobenzene, 2,4,6-triisocyanatotoluene and 4,4'-dimethyldiphenylmethane-2,2',5,5'-tetraisocyanate; biuret adducts and isocyanuric ring adducts of such polyisocyanates; urethanized adducts obtained by reacting a polyol such as ethylene glycol, propylene glycol, 1,4-butylene glycol, dimethylolpropionic acid, polyalkylene glycols, trimethylol propane or hexanetriol, with a polyisocyanate compound in a ratio such that the amount of isocyanate groups is excessive relative to the amount of polyol hydroxy groups; biuret adducts and isocyanuric ring adducts of such polyisocyanates; etc.

The above blocking agents, which block free isocyanate groups, easily react with isocyanate groups when, for example, heated to 100° C. or more, and preferably 130° C. or more.

Examples of usable blocking agents include phenol, cresol, xylenol, nitrophenol, ethylphenol, hydroxydiphenyl, butylphenol, isopropylphenol, nonylphenol, octylphenol, hydroxybenzoic acid methyl and other phenol compounds; ε-caprolactam, δ-valerolactam, γ-butyrolactam, β-propiolactam and other lactam compounds; methanol, ethanol, propyl alcohol, butyl alcohol, amyl alcohol, lauryl alcohol and other aliphatic alcohol compounds; ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and other ether compounds; benzyl alcohol; glycolic acid; methyl glycolate, ethyl glycolate, butyl glycolate and other glycolic acid esters; lactic acid, methyl lactate, ethyl lactate, butyl lactate and other lactates; methylolurea, methylol melamine, diacetone alcohol, 2-hydroxyethyl acrylate, 2-hydroxyethyl methacrylate and other alcohol compounds; formamide oxime, acetamide oxime, acetoxime, methyl ethyl ketoxime, diacetyl monoxime, benzophenone oxime, cyclohexane oxime and other oxime compounds; dimethyl malonate, diethyl malonate, ethyl acetoacetate, methyl acetoacetate, acetylacetone and other activated methylene compounds; butyl mercaptan, t-butyl mercaptan, hexyl mercaptan, t-dodecyl mercaptan, 2-mercaptobenzothiazole, thiophenol, methylthiophenol, ethylthiophenol and other mercaptan compounds; acetanilide, acetanisidide, acetotoluide, acrylamide, methacrylamide, acetamide, stearamide, benzamide and other acid amide compounds; succinimide, phthalimide, maleimide and other imide compounds; diphenylamine, phenylnaphthylamine, xylidine, N-phenylxylidine, carbazole, aniline, naphthylamine, butylamine, dibutylamine, butylphenylamine and other amine compounds; imidazole, 2-ethyl imidazole and other imidazole compounds; urea, thiourea, ethylene urea, ethylenetiourea, diphenylurea and other urea compounds; N-phenyl carbamate phenyl and other carbamate compounds; ethyleneimine, propyleneimine and other imine compounds; sodium bisulfite, potassium bisulfite and other sulfite compounds;

3,5-dimethylpyrazole, 3-methylpyrazole, 4-nitro-3,5-dimethyl pyrazole, 4-bromo-3,5-dimethylpyrazole and the like. The most preferable blocking agent among these is methylethyl ketoxime or 3,5-dimethylpyrazole.

Further, hydroxycarboxylic acids containing hydroxy groups and carboxy groups, such as hydroxypivalic acid and dimethylolpropionic acid, can also be employed as a blocking agent for isocyanate groups of polyisocyanates. Blocked polyisocyanate compounds, to which, after blocking, water dispersibility has been imparted by neutralization of carboxy groups of hydroxycarboxylic acids, are suitable as a curing agent. Commercial products of such curing agents include, for example, "Bayhydur BL 5140" (a tradename of Sumika Bayer Urethane Co., Ltd.).

Coloring Pigment (D)

The aqueous intermediate coating composition of the present invention comprises coloring pigment (D). Examples of usable coloring pigments include inorganic pigments such as titanium oxide, zinc white, carbon black, Prussian blue and cobalt blue; organic pigments such as azo pigments, phthalocyanine pigments, quinacridone pigments, isoindoline pigments, vat pigments and perylene pigments; etc.

Formulation, Preparation, Characteristics and Application of Intermediate Coating Composition In the aqueous intermediate coating composition of the present invention, the proportions of acrylic emulsion resin (A), hydroxy-containing resin (B), curing agent (C) and coloring pigment (D), which are essential ingredients, are preferably as below to obtain a coating composition with a solids content as high as 60 wt. % or more, which is excellent in stability, chipping resistance and other film performance characteristics.

The proportions of acrylic emulsion resin (A) and hydroxy-containing resin (B) in the total weight thereof are preferably such that the former is about 30 to about 99 wt. % and the latter is about 1 to about 70 wt. %. More preferably, former is about 35 to about 80 wt. % and the latter is about 20 to about 65 wt. %.

The proportion of curing agent (C) is preferably about 1 to about 150 parts by weight, and more preferably about 5 to about 100 parts by weight, per 100 parts by weight in total of acrylic emulsion resin (A) and hydroxy-containing resin (B).

The proportion of coloring pigment (D) is preferably about 1 to about 400 parts by weight, and more preferably about 50 to about 300 parts by weight, per 100 parts by weight in total of acrylic emulsion resin (A) and hydroxy-containing resin (B).

If necessary, aqueous intermediate coating compositions of the present invention may be further blended with extender pigments, metallic pigments, dispersants, sedimentation inhibitors, organic solvents, promoter catalysts for urethanization reactions (e.g., organic tin compounds etc.), promoter catalysts for crosslinking reactions between hydroxy groups and melamine resins (e.g., acid catalysts), defoaming agents, thickeners, anticorrosives, ultraviolet absorbers, surface conditioners, anti-cratering agents, polyurethane emulsions, polyolefine emulsions, self-crosslinking resins and/or the like.

Examples of usable extender pigments include clay, baryta, precipitated barium sulphate, barium carbonate, calcium carbonate, silica, white carbon, diatomaceous earth, magnesium carbonate, talc, aluminium flakes, mica flakes, etc. Examples of usable metallic pigments include flaky aluminum, mica, metal oxide-coated mica, micaceous iron oxide, etc.

Preferable examples of self-crosslinking resins are urethane-modified polyester resins having both hydroxy groups and blocked isocyanate groups per molecule, etc.

The aqueous intermediate coating composition of the present invention can be prepared by mixing the above-described ingredients together with, if necessary, water or a mixture of water and organic solvent, using a conventional method in such a manner that the solids content of the resulting composition is 60 wt. % or more. The solids content is preferably 62 wt. % or more, and more preferably 65 wt. % or more.

In this specification, the solids content of a coating composition is the solids concentration (wt. %) determined by placing about 1 g of the coating composition into an aluminum foil cup with a diameter of about 5 cm, accurately weighting the composition, drying at 110° C. for 1 hour, re-weighing, and calculating the concentration.

Although having a high solids content as described above, the aqueous intermediate coating composition of the present invention has such a low viscosity that the viscosity thereof as measured with Ford Cup No. 4 (20° C.) at a solids content of 60 to 75 wt. % is usually about 15 to about 60 seconds, and preferably about 15 to about 30 seconds, and the composition can thus be applied with a high coating efficiency using a conventional coating method.

The aqueous intermediate coating composition of the present invention can be used to form an intermediate coating layer on various substrates employing a conventional method such as, for example, brush coating, air spray coating, airless spray coating or electrostatic coating. The thickness of such an intermediate coating layer is usually in the range of about 3 to about 100 μm (when cured), and preferably about 5 to about 60 μm (when cured). The coating layer can be crosslinked and cured by heating at about 120 to about 170° C., preferably about 130 to about 150° C., for about 10 to about 40 minutes.

The thus-obtained cured coating layer consisting of the above aqueous coating composition usually has an elongation at break (%) as measured by a tensile test at −20° C. of 3% or more, and preferably 3.5% or more, which shows that a multilayer coating film containing this coating layer as an intermediate coating has excellent chipping resistance. Said elongation at break is a value obtained in a tensile test using a universal tensile test device provided with a thermostat chamber, employing a coating film specimen having a length of 20 mm, a width of 5 mm and a thickness of 30 μm. As a universal tensile test device provided with a thermostat chamber, for example, "Autograph S-D" (a tradename of Shimadzu Corp.) can be used.

Method for Forming Multilayer Coating Film

The method for forming a multilayer coating film of the present invention comprises the steps of forming an electrodeposition coating layer, an intermediate coating layer and then a topcoating layer on a substrate to obtain a multilayer coating film, wherein the intermediate coating layer is formed from the aqueous intermediate coating composition of the present invention.

Preferable examples of substrates to be coated include the bodies of automobiles, bicycles and the like, and automotive bodies are particularly preferable. The substrate may also be a metal substrate etc. for such a body, examples thereof including steel sheets such as cold-rolled steel plates, galvanized steel plates, alloy galvanized steel plates, stainless steel plates and tinned steel plates; aluminum plates; aluminium alloy plates; and the like. Such bodies and metal substrates may have been subjected to surface treatments such as phosphate treatment and chromate treatment.

According to the method for forming a multilayer coating film of the present invention, an undercoating layer of any one of various known electrodeposition coating compositions is first formed on a substrate. Examples of usable electrodeposition coating compositions include, but are not limited to, known cationic electrodeposition coating compositions and anionic electrodeposition coating compositions. Cationic electrodeposition coating compositions are preferable, as they have excellent corrosion resistance. Electrodeposition and heat-curing may be performed by methods and under conditions as typically employed for the electrodeposition coating of automotive bodies and the like.

The aqueous intermediate coating composition of the present invention is then applied to a thickness of about 5 to about 60 μm (when cured), without using an anti-chipping primer.

It is also possible to integrate a metal member having an undercoating layer of a known electrodeposition coating composition with a plastic member such as a bumper, and then apply the intermediate coating composition to the obtained integrated substrate. This operation is advantageous in that the colors on the metal member and the plastic member can be uniform, and further, a multilayer coating film with excellent chipping resistance can be formed on both members.

Subsequently, a topcoating layer is formed on the intermediate coating layer while uncured or after curing by heating at about 120 to about 170° C. for about 10 to about 40 minutes.

The topcoating layer can be formed using one or more of various known topcoating compositions by various known coating and curing processes. That is, either a monolayer or multilayer topcoating layer can be formed using one or more kinds of topcoating compositions selected from solid color coating compositions, metalic coating compositions, light-interference coating compositions, clear coating compositions and the like.

The monolayer or multilayer uncured topcoating layer obtained from one or more topcoating compositions is heat-cured, together with the intermediate coating layer if it has not yet been cured, at, for example, about 60 to about 180° C. for about 10 to about 90 minutes, and accordingly, a multilayer coating film comprising an undercoating layer, an intermediate coating layer and a topcoating layer is obtained. When the topcoating layer is a multilayer of two or more layers, the heat-curing may be done either in a single operation or in two or more operations.

In this way, using the method for forming a multilayer coating film of the present invention, a multilayer coating film with excellent chipping resistance can be suitably formed on a substrate such as an automotive body, without using any anti-chipping primer.

The aqueous intermediate coating composition of the present invention and the method for forming a multilayer coating film using the same achieve the following remarkable effects.

(1) A multilayer coating film comprising an undercoating layer, an intermediate coating layer and a topcoating layer, and which has excellent chipping resistance and water resistance together with an enhanced appearance, can be formed on a substrate such as an automotive body without using an anti-chipping primer.

(2) Energy savings can be achieved by reducing volatile organic compounds (VOC), and also by obviating the need for an anti-chipping primer, thereby decreasing the number of coating steps.

The reasons for the above remarkable effects are presumed that since the aqueous intermediate coating composition contains a specific emulsion resin obtainable by emulsion polymerization, a reduction of volatile organic compounds has become possible; buffering effects against external impacts such as from kicked-up gravels are enhanced by extensive use of ethyl acrylate as a monomer for such emulsion polymerization, and the formation of multilayer coating film having excellent chipping resistance has accordingly become achievable; etc.

EXAMPLES

The following Production Examples, Examples and Comparative Examples are provided to illustrate the present invention in further detail; however, the present invention is not limited thereto. In the following examples, parts and percentages are by weight.

Production Example 1

Production of Acrylic Emulsion Resin A1

(1) Fifty-four parts of deionized water, 0.5 parts of anionic surfactant (tradename "Newcol 707SF", manufactured by Nippon Nyukazai Co., Ltd., nonvolatile content: 30%), 93 parts of ethyl acrylate, 5 parts of hydroxy ethyl acrylate, 1 part of acrylic acid and 1 part of allyl methacrylate were agitated and emulsified to thereby obtain a monomer mixture.

(2) Forty parts of deionized water and 0.8 parts of "Newcol 707SF" were introduced to a four neck flask provided with an agitator, a thermometer, a reflux condenser and a nitrogen gas inlet, and, after purging with nitrogen gas, maintained at 82° C. while being agitated. A mixture of 5 parts of the emulsified monomer mixture obtained in (1) and 0.3 parts of ammonium persulfate dissolved in 3 parts of deionized water was added thereto, and, after 20 minutes, another mixture of the rest of the monomer mixture obtained in (1) and 0.3 parts of ammonium persulfate dissolved in 3 parts of deionized water was further added dropwise over 4 hours to thereby perform emulsion polymerization.

The emulsion polymerization was continued at 82° C. for 2 hours after completion of the dropwise addition, and then the temperature in the flask was lowered to 40° C. The pH was adjusted to 8.5 with aqueous ammonia, and acrylic emulsion resin A1 having a solids content of 50 wt. % was thereby obtained. The mean particle diameter of the obtained emulsion resin particles was 0.15 μm, the acid value of the resin was 7.8 mgKOH/g, and the glass transition temperature of the resin was 23° C.

Production Examples 2 to 6

Production of Acrylic Emulsion Resins A2 to A6

Using the monomer components in Table 1 in the amounts indicated, acrylic emulsion resins A2 to A6 were obtained in the same manner as in Production Example 1.

TABLE 1

|  |  | Production Example | | | | | |
|---|---|---|---|---|---|---|---|
|  |  | 1 | 2 | 3 | 4 | 5 | 6 |
| Acrylic emulsion resin No. |  | A1 | A2 | A3 | A4 | A5 | A6 |
| Monomer components | Ethyl acrylate | 93 | 73 | 50 | 45 | 80 | 91.3 |
|  | Methyl acrylate |  | 20 |  | 48 |  |  |
|  | N-Butyl acrylate |  |  | 23 |  |  |  |
|  | N-Butyl methacrylate |  |  |  | 20 |  |  |
|  | Hydroxy ethyl acrylate | 5 | 5 | 5 | 5 | 18 | 5 |
|  | Acrylic acid | 1 | 1 | 1 | 1 | 1 | 2.7 |
|  | Allylmethacrylate | 1 | 1 | 1 | 1 | 1 | 1 |
| Resin properties | Glass transition temperature (° C.) | −23 | −4 | −23 | +27 | −29 | −20 |
|  | Hydroxy value (mgKOH/g) | 24 | 24 | 24 | 24 | 87 | 24 |
|  | Acid value (mgKOH/g) | 7.8 | 7.8 | 7.8 | 7.8 | 7.8 | 21 |

Production Example 7

Production of Polyester Resin B1

In a four neck flask provided with a heating device, an agitator, a thermometer, a reflux condenser and a water separator, 33.0 parts of isophthalic acid, 16.7 parts of adipic acid, 16.5 parts of 1,4-cyclohexanedimethanol, 20.9 parts of trimethylolpropane and 18.4 parts of 2-butyl-2-ethyl-1,3-propanediol were mixed, and then heated. Subsequently, after the temperature of the mixture was elevated from 160° C. to 230° C. over three hours, the mixture was reacted at 230° C. until the acid value dropped to 3 mgKOH/g or less, while the generated condensation water was distilled off via a rectifying column.

Next, after 5.7 parts of anhydrous trimellitic acid was added to the obtained product, 5.3 parts of dimethylethanolamine were added for neutralization, and then 144.7 parts of water was further added, thereby giving a polyester resin B1 solution having a solids content of 40%. The hydroxy value of polyester resin B1 was 150 mgKOH/g, the acid value was 35 mgKOH/g, and the number average molecular weight was 2,000.

Production Example 8

Production of Self-Crosslinking Resin S1

A polyester resin was obtained by reacting 0.2 mol of trimethylolpropane, 0.8 mol of 1,6-hexanediol, 0.4 mol of hexahydrophthalic acid and 0.3 mol of adipic acid, and then adding 0.05 mol of anhydrous trimellitic acid thereto. The obtained polyester resin (100 parts) was reacted in methyl ethyl ketone with a polyurethane (30 parts) obtained by reacting 2 mol of 4,4'-methylenebis(cyclohexyl isocyanate) with 1 mol of dimethylolpropionic acid, and then a portion of the hydroxy groups contained in the thereby obtained reaction product (130 parts) was reacted with a half blocked polyisocyanate compound (10 parts) obtained by reacting methyl ethyl ketoxime with 4,4'-methylenebis(cyclohexyl isocyanate) at an equimolar ratio. Subsequently, the preparation was subjected to solvent removal, dimethylethanolamine was added for neutralization, and then water was added, thereby giving an aqueous dispersion of self-crosslinking resin S1 which is an urethane-modified polyester resin containing at least one hydroxy group together with at least one blocked isocyanate group per molecule. The hydroxy value of self-crosslinking resin S1 was 90 mgKOH/g, the acid value was 38 mgKOH/g, the NCO value was 10, and the number average molecular weight was 2,000.

Example 1

Production of Aqueous Intermediate Coating Composition No. 1

One part of carbon black[*1] and 130 parts of titanium white pigment[*2] were added to 29 parts (as solids) of polyester resin B1 obtained in Production Example 7, and then the preparation was mixed in a paint shaker for one hour to thereby obtain a pigment-dispersed paste. To the obtained pigment-dispersed paste, 71 parts (as solids) of acrylic emulsion resin A1, 28 parts (as solids) of blocked polyisocyanate[*3] and 14 parts of imino-containing methylated melamine resin[*4] were added under agitation with a disper, and deionized water and dimethylethanolamine were further added thereto to adjust the pH to 8.5 and the viscosity as measured with Ford Cup No. 4 (20° C.) to 25 seconds, thereby giving aqueous intermediate coating composition No. 1. The solids content of aqueous intermediate coating composition No. 1 was 62 wt. %.

Examples 2 to 5 and Comparative Examples 1 to 4

Using the components in Table 2 in the amounts indicated, aqueous intermediate coating compositions No. 2 to No. 9 were obtained in the same manner as in Example 1. The viscosity, solids content, VOC, and elongation at break of each coating composition are also provided in Table 2.

TABLE 2

|  |  | Example | | | | | Comparative Example | | | |
|---|---|---|---|---|---|---|---|---|---|---|
|  |  | 1 | 2 | 3 | 4 | 5 | 1 | 2 | 3 | 4 |
| Aqueous intermediate coating composition No. |  | 1 | 2 | 3 | 4 | 5 | 6 | 7 | 8 | 9 |
| Acrylic emulsion resin | A1 | 71 |  | 50 |  | 43 |  |  |  |  |
|  | A2 |  | 71 |  | 58 | 28 |  |  |  |  |
|  | A3 |  |  |  |  |  |  |  | 71 |  |

TABLE 2-continued

| | Example | | | | | Comparative Example | | | |
|---|---|---|---|---|---|---|---|---|---|
| | 1 | 2 | 3 | 4 | 5 | 1 | 2 | 3 | 4 |
| A4 | | | | | | | 56 | | |
| A5 | | | | | | | | 83 | |
| A6 | | | | | | | | | 63 |
| Polyester resin B1 | 29 | 29 | 50 | 42 | 29 | 29 | 44 | 17 | 37 |
| Carbon black(*1) | 1 | 1 | 1 | 1 | 1 | 1 | 1 | 1 | 1 |
| Titanium white pigment(*2) | 130 | 130 | 114 | 152 | 130 | 130 | 100 | 250 | 114 |
| Blocked polyisocyanate(*3) | 28 | 28 | | 25 | 21 | 28 | | | |
| Imino-containing methylated melamine resin(*4) | 14 | 14 | 25 | 10 | 21 | 14 | 11 | 67 | 25 |
| Self-crosslinking resin S1 | | | | 20 | | | | | |
| Viscosity (seconds) | 25 | 25 | 25 | 25 | 25 | 25 | 25 | 25 | 25 |
| Solids content (%) | 62 | 62 | 60 | 60 | 62 | 62 | 62 | 50 | 52 |
| VOC (g/l) | 73 | 73 | 97 | 85 | 79 | 73 | 73 | 130 | 100 |
| Elongation at break (%) | 4.5 | 4.0 | 3.0 | 8.0 | 4.5 | 2.0 | 1.0 | 0.1 | 2.5 |

In Table 2, (*1) to (*4) indicate the following.
(*1)Carbon black: tradename "Carbon MA100", manufactured by Mitsubishi Chemical Co., Ltd.
(*2)Titanium white pigment: tradename "JR-806", manufactured by TAYCA Co., Ltd.
(*3)Blocked polyisocyanate: tradename "Bayhydur BL5140", manufactured by Sumika Bayer Urethane Co., Ltd.
(*4)Imino-containing methylated melamine resin: tradename "Cymel 325", manufactured by Japan Cytec Industries Inc.

Viscosities in Table 2 were measured at 20° C. with Ford cup No. 4. VOC values were obtained by premeasuring the coating composition for solids content, specific gravity (measured by the specific gravity cup method defined in JIS K-5400 4.6.2) and moisture content (measured using an automatic moisture measuring device KF-100, manufactured by Mitsubishi Chemical Co., Ltd.), and calculating the VOC amount in the coating composition excluding water by the formula below. In the formula, the solids content is the solids content of the coating composition excluding water, and specific gravity A is the specific gravity of the coating composition excluding water.

$$VOC(g/l) = 1000 \times \text{specific gravity } A \times [(100-\text{solids content})/100]$$

Elongation at break values in Table 2 are obtained, using a coating film specimen prepared by cutting a single layer film consisting of the coating composition (heat-cured at 150° C. for 30 minutes; 30 μm thick) into a rectangular shape (0.5×2 cm), by measuring the elongation (%) of the specimen at breaking at −20° C. with an elongation rate of 20 mm/min using a universal tensile test device provided with a thermostat chamber (tradename "Autograph S-D", manufactured by Shimadzu Corp.).

Example 6

Formation of Multilayer Coating Film

A cationic electrodeposition coating composition (tradename "Elecron GT-10LF", manufactured by Kansai Paint Co., Ltd.) was electrodeposited on a galvanized steel plate which had been surface-treated with a zinc phosphating agent (trade name "Palbond 3020", manufactured by Nihon Parkerizing Co., Ltd.), and then heated at 170° C. for 20 minutes to thereby obtain a plate having an electrodeposition coating layer, the layer thickness being 20 μm (when cured).

Aqueous intermediate coating composition No. 1 was applied to this electrodeposition-coated plate by spray coating to a thickness of 30 μm (when cured), left at room temperature for 3 minutes, predried at 80° C. for 10 minutes, and then baked at 150° C. for 30 minutes. An acrylic resin/melamine resin base coating composition (tradename "aqueous metallic basecoat WBC710T", manufactured by Kansai Paint Co., Ltd.) was further applied thereto by spray coating to a thickness of 15 μm (when cured), left for 3 minutes at room temperature, and predried at 80° C. for 10 minutes. Subsequently, an acid-epoxy-curing acrylic resin clear coating composition (tradename "KINO #1200TW clear", manufactured by Kansai Paint Co., Ltd.) was then applied by spray coating to the surface of the uncured base coating layer to a thickness of 35 μm (when cured), left at room temperature for 5 minutes, and heated for at 140° C. for 30 minutes to thereby obtain multilayer coating film No. 1.

Examples 7 to 10

Formation of Multilayer Coating Film

Multilayer coating films No. 2 to No. 5 having the structures as listed in Table 3 were formed following the procedure of Example 6.

Comparative Examples 5 to 8

Formation of Multilayer Coating Film

Multilayer coating films No. 6 to No. 9 having the structures as listed in Table 3 were formed following the procedure of Example 6.

The obtained multilayer coating films No. 1 to No. 5 of Examples and multilayer coating films No. 6 to No. 9 of Comparative Examples were tested for film performance, i.e., appearance, water resistance and chipping resistance, by the following methods.

Appearance: The outer appearance of the multilayer coating film was evaluated by observing the surface by the naked eye as to smoothness, gloss, and image sharpness. Each item was ranked as listed below.

A: satisfactory
B: somewhat poor
C: extremely poor

Water resistance: A test panel provided with the multilayer coating film was immersed in warm water at 40° C. for 10 days, and cross cuts were made therein so as to form 100 squares (2 mm×2 mm). An adhesive tape was adhered to the cut surface and peeled off, and the surface was observed. Water resistance was evaluated according to the following criteria:

A: 100 crosscut squares remaining;
B: 90 to 99 crosscut squares remaining;
C: less than 90 crosscut squares remaining.

Chipping resistance: A test panel provided with the multilayer coating film was fixed on a sample holder of a chipping test device (tradename "Gravel Chipping Test Instrument JA-400", manufactured by Suga Test Instruments Co., Ltd.,) at an angle such that the coating surface is perpendicular to the gravel outlet, and 50 g of crushed granite of No. 7 particle size was sprayed on the coating surface with compressed air at 0.294 MPa (3 kgf/cm$^2$) at −20° C. A cloth adhesive tape (manufactured by Fuji Ultrasonic Engineering Co., Ltd.) was applied to the coating surface and rapidly peeled off, and the degree of the formation of scratches and the like thereon was observed by the naked eye and evaluated according to the following criteria:

A: scratches having a diameter of not more than 1.0 mm, with the topcoating layer partially scratched;
B: scratches having a diameter of more than 1.0 mm but not more than 1.5 mm, with the intermediate coating layer partially exposed;
C: scratches having a diameter of more than 1.5 mm but not more than 2.0 mm, with the intermediate coating layer partially damaged so that the electrodeposition coating layer or steel plate is exposed;
D: scratches having a diameter of more than 2.0 mm, with the intermediate coating layer greatly exposed, or with the intermediate coating layer damaged whereby electrodeposition coating layer or steel plate is exposed, so that the appearance is significantly degraded.

Table 3 lists the structures of the multilayer coating films and the results of the performance tests. In Table 3, the intermediate coating layer No. shows the No. of the aqueous intermediate coating composition used.

mixture (a) comprising ethyl acrylate, a hydroxy-containing radically polymerizable unsaturated monomer and a carboxy-containing radically polymerizable unsaturated monomer, the ethyl acrylate content of the monomer mixture being 70 wt. % or more;

(B) a hydroxy-containing polyester resin having a hydroxy value of more than 80 mgKOH/g but not more than 200 mgKOH/g, which is obtained by an esterification reaction of a polybasic acid with a polyhydric alcohol;

(C) a curing agent; and (D) a coloring pigment, the solids content of said aqueous intermediate coating composition being 60 wt. % or more.

2. An aqueous intermediate coating composition according to claim 1, wherein acrylic emulsion resin (A) is obtainable by emulsion polymerization of monomer mixture (a) using a hydroxy-containing resin as an emulsifier.

3. An aqueous intermediate coating composition according to claim 1, wherein hydroxy-containing polyester resin (B) contains at least one acid group and has an acid value of 1 to 70 mgKOH/g.

4. An aqueous intermediate coating composition according to claim 1, wherein the proportions of acrylic emulsion resin (A) and hydroxy-containing polyester resin (B) are 30 to 99 wt. % and 1 to 70 wt. %, respectively, of the total weight of these resins.

5. An aqueous intermediate coating composition according to claim 1, wherein the proportion of curing agent (C) is 1 to 150 parts by weight per 100 parts by weight in total of acrylic emulsion resin (A) and hydroxy-containing polyester resin (B).

6. An aqueous intermediate coating composition according to claim 1, wherein the proportion of coloring pigment (D) is 1 to 400 parts by weight per 100 parts by weight in total of acrylic emulsion resin (A) and hydroxy-containing polyester resin (B).

7. An aqueous intermediate coating composition according to claim 1, whose viscosity as measured with Ford Cup No. 4 (20° C.) is 15 to 60 seconds.

TABLE 3

|  |  |  | Examples | | | | | Comparative Examples | | | |
| --- | --- | --- | --- | --- | --- | --- | --- | --- | --- | --- | --- |
|  |  |  | 6 | 7 | 8 | 9 | 10 | 5 | 6 | 7 | 8 |
| Multilayer coating film No. |  |  | 1 | 2 | 3 | 4 | 5 | 6 | 7 | 8 | 9 |
| Film structure | Electrodeposition coating layer |  | Present | Present | Present | Present | Present | Present | Present | Present | Present |
|  | Intermediate coating layer (No.) |  | 1 | 2 | 3 | 4 | 5 | 6 | 7 | 8 | 9 |
|  | Topcoating layer (base coating layer/ clear coating layer) |  | Present | Present | Present | Present | Present | Present | Present | Present | Present |
| Performance | Appearance | Smoothness | A | A | A | A | A | B | B | C | C |
|  |  | Gloss | A | A | A | A | A | A | A | A | A |
|  |  | Image sharpness | A | A | A | A | A | B | B | B | B |
|  | Water resistance |  | A | A | A | A | A | C | B | C | C |
|  | Chipping resistance |  | A | B | B | A | A | D | C | D | C |

The invention claimed is:

1. An aqueous intermediate coating composition comprising:
(A) an acrylic emulsion resin having a hydroxy value of 5 to 80 mgKOH/g and an acid value of 1 to 15 mgKOH/g, obtainable by emulsion polymerization of monomer 8. An aqueous intermediate coating composition according to claim 1, wherein the ethyl acrylate content of monomer mixture (a) is 80 to 95 wt. %.

* * * * *